United States Patent Office 3,635,974
Patented Jan. 18, 1972

3,635,974
α-PHENYL-2-AMINOMETHYL-BENZYLALCOHOLS
AND SALTS THEREOF
Kutr Freter, Beaconsfield, Quebec, Manfred Götz, Hudson, Quebec, and James T. Oliver, Beaconsfield, Quebec, Canada, and Karl Zeile, Ingelheim am Rhein, Germany, assignors to Boehringer Ingelheim G.m.b.H., Ingelheim am Rhein, Germany
No Drawing. Filed Dec. 20, 1968, Ser. No. 785,750
Int. Cl. C07c 87/28; C07d 5/12, 57/36
U.S. Cl. 260—253
2 Claims

ABSTRACT OF THE DISCLOSURE

The compounds are α-substituted 2-aminomethyl-benzylalcohols and their non-toxic acid addition salts, useful as anorectics in warm-blooded animals.

This invention relates to novel α-substituted 2-aminomethyl-benzylalcohols and acid addition salts thereof, as well as to various methods of preparing these compounds.

More particularly, the present invention relates to a novel class of compounds of the formula

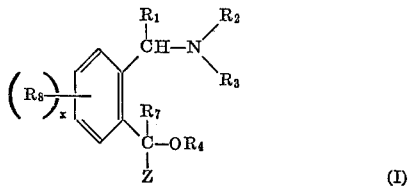

(I)

wherein $R_1$ is hydrogen or alkyl of 1 to 4 carbon atoms,
$R_2$ is hydrogen, alkyl of 1 to 4 carbon atoms, acyl or alkoxycarbonyl,
$R_3$ is hydrogen, alkyl of 1 to 5 carbon atoms, hydroxyalkyl of 1 to 5 carbon atoms, aminoalkyl, alkylaminoalkyl, dialkylaminoalkyl, acylaminoalkyl, acyl-alkylaminoalkyl, N-alkyl-hydrazinoalkyl, N,N-dialkyl-hydrazinoalkyl, cycloalkyl or benzyl,
$R_4$ is hydrogen, alkyl, alkoxycarbonyl or acyl,
Z is cyclohexenyl, benzyl, halo-benzyl or

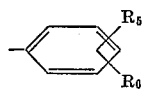

where $R_5$ is hydrogen, halogen or trifluoromethyl, and
$R_6$ is hydrogen, halogen, methyl or methyl-mercapto,
$R_7$ is hydrogen or methyl,
$R_8$ is hydrogen, halogen, or the methoxy group and
$x$ is the integer 1 or 2, and their non-toxic, pharmacologically acceptable acid addition salts.

The compounds embraced by Formula I may be prepared by number of different methods involving well known chemical principles, among which the following have proved to be particularly convenient and efficient:

METHOD A

By ring cleavage of a phthalide with an amine, and subsequent reduction of the acid amide formed thereby, pursuant to the following reaction formula

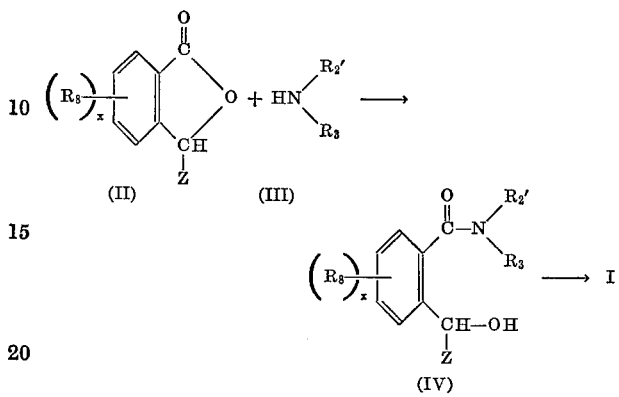

where $R_2$ is alkyl of 1 to 4 carbon atoms, and $R_3$, Z, $x$ and $R_8$ have the same meanings as in Formula I.

For this reaction a solution of a phthalide of the Formula II in an inert solvent, such as an alcohol, benzene, toluene or xylene, is first combined with an amine of the Formula III. In the event that the amine III is a liquid, the reaction may also be performed without the addition of a solvent. In some cases the reaction proceeds at room temperature, but in general it is more advantageous to perform the reaction at higher temperatures, possibly at the reflux temperature of the particular solvent which is employed.

In this manner the corresponding aminocarbonyl compound of the Formula IV is obtained, whose carbonyl group is then reduced into the $CH_2$-group in customary fashion, for instance with a suitable complex hydride, such as lithium aluminum hydride.

According to this method those compounds of the Formula I are obtained wherein $R_1$ is hydrogen, $R_2$ is alkyl of 1 to 4 carbon atoms, and $R_4$ and $R_7$ are hydrogen.

Since the carbonyl group of compound of the Formula IV cannot be directly reduced in the case of tertiary carbinols ($R_7$=methyl), the conversion of such a compound into a compound of the Formula I is effected by way of the corresponding isoindolinone of the formula

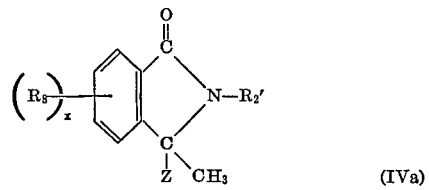

(IVa)

wherein $R_2'$ has the same meanings as in Formula III and $R_8$, $x$ and Z have the same meanings as in Formula I. This compound can then, as indicated, be reduced by means of a suitable complex hydride, and hydrolized.

For the preparation of a compound of the Formula I wherein $R_2$ and/or $R_4$ are acyl, the compound of the Formula I thus obtained is subsequently reacted with the calculated amount (for $R_2$=acyl) or with an excess (for $R_2$ and $R_4$=acyl) of a carboxylic acid anhydride or a carboxyl acid halide, preferably in the presence of an organic base.

A compound of the Formula I wherein $R_2$ is alkoxycarbonyl may be obtained by reacting a corresponding compound wherein $R_2$ is hydrogen with a haloformic acid ester.

An alkyl group may be introduced into a compound of the Formula I wherein $R_2$ or $R_3$ is hydrogen by conventional methods, for instance by reaction with an alkyl halide or a dialkyl sulfate.

A compound of the Formula I wherein $R_4$ is alkyl may be obtained by etherification of the free hydroxyl group in accordance with customary procedures, for example by reaction with the corresponding alcohol in the presence of a hydrohalic acid.

A compound of the Formula I wherein $R_2$ and $R_4$ are alkoxycarbonyl may readily be obtained by reacting the corresponding compound having a free amino group with a haloformic acid ester.

If $R_3$ is benzyl in a compound of the Formula I, this substituent may be removed, if desired, by hydrogenation.

METHOD B

By ring cleavage of an isoindoline with an acyl anhydride and, if desired, hydrolysis of the diacyl compound formed thereby, pursuant to the following reaction sequence:

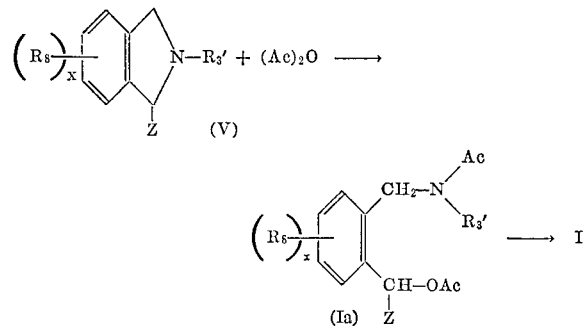

wherein Ac is acyl, preferably acetyl, $R_8$ and Z have the same meanings as in Formula I, X and $R_3'$ has the same meanings as in Formula I with the exception of hydrogen.

For this reaction a compound of the Formula V is dissolved in the acyl anhydride or, together with the anhydride, in a suitable inert solvent, and the solution is heated, preferably under reflux. The reaction period depends upon the reactivity of the particular reaction partners and may vary between a few minutes and several days. After completion of the reaction the diacylated compound of the Formula Ia is isolated, and for the preparation of a non-acylated end product of the Formula I the diacylated Compound Ia is dissolved in a suitable inert solvent and, after addition of a strong base such as an alkali metal hydroxide, the solution is heated. After the completion of the de-acylation the benzyl alcohol of the Formula I is isolated by customary methods.

A compound of the Formula I wherein $R_2$ and $R_4$ are hydrogen, which is obtained as a result of the above de-acylation procedure, may subsequently also be etherified, esterified or alkylated, as indicated in method A.

METHOD C

By reducing a compound of the formula

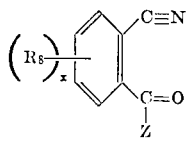

wherein $R_8$, X and Z have the same meanings in Formula I, with a suitable reducing agent, for example with a complex hydride such as lithium aluminum hydride.

A compound of the Formula I wherein $R_2$, $R_3$, $R_4$ and $R_7$ are hydrogen is obtained thereby, and this compound may subsequently be alkylated, acylated, etherified or esterified, as indicated in method A.

The compounds embraced by Formula I are organic bases and therefore form acid addition salts with inorganic or organic acid. Examples of non-toxic, pharmacologically acceptable acid addition salts are those formed with hydrochloric acid, hydrobromic acid, sulfuric acid, nitric acid, phosphoric acid, perchloric acid, formic acid, acetic acid, propionic acid, oxalic acid, succinic acid, tartaric acid, citric acid, maleic acid, ascorbic acid, salicylic acid, methanesulfonic acid, toluenesulfonic acid, 8-chlorotheophylline and the like.

The compounds of the Formula I comprise an asymmetric carbon atom and are obtained in the course of the synthesis in the form of racemic mixtures, unless an optically active starting compound is used. The separation of the racemic mixtures into their optically active antipode components may be effected pursuant to customary procedures, for instance by salt formation with optically active auxiliary acids, such as dibenzoyl-D-tartaric acid or (+)-3-bromocamphor-8-sulfonic acid, subsequent fractional crystallization of the diastereomeric salts and liberation of the bases. Likewise, racemic as well as optically active starting compounds may be used in the alkylation, acylation, esterification and etherification procedures described in method A.

Using the above-described methods of preparation, the following compounds of the Formula I or their non-toxic, pharmacologically acceptable acid addition salts may be obtained, for example:

2-aminomethyl-α-phenyl-benzylalcohol,
2-methylaminomethyl-α-phenyl-benzylalcohol-2-methyl-aminomethyl-α-(4-fluorophenyl)-benzylalcohol,
2-methylaminomethyl-α-(2-chlorophenyl)-benzylalcohol,
2-methylaminomethyl-α-(3-chlorophenyl)-benzylalcohol,
2-methylaminomethyl-α-(4-chlorophenyl)-benzylalcohol,
2-methylaminomethyl-α-(4-bromophenyl)-benzylalcohol,
2-methylaminomethyl-2-(4-iodophenyl)-benzylalcohol,
2-methylaminomethyl-α-(3-trifluoromethyl-phenyl)-benzylalcohol,
2-methylaminomethyl-α-(3-trifluoromethyl-4-chlorophenyl)-benzylalcohol,
2-ethylaminomethyl-α-(4-chlorophenyl)-benzylalcohol,
2-n-butylaminomethyl-α-(4-chlorophenyl)-benzylalcohol,
2-isobutylaminomethyl-α-(4-chlorophenyl)-benzylalcohol,
2-cyclohexylaminomethyl-α-(4-chlorophenyl)-benzylalcohol
2-benzylaminomethyl-α-(4-chlorophenyl)-benzylalcohol,
2-dimethylaminomethyl-α-(4-chlorophenyl)-benzylalcohol,
2-(2-hydroxyethyl)-aminomethyl-α-(4-chlorophenyl)-benzylalcohol,
2-(2-aminoethyl)-aminomethyl-α-(4-chlorophenyl)-benzylalcohol,
2-(2-methylaminoethyl)-aminomethyl-α-(4-chlorophenyl)-benzylalcohol,
2-(2-dimethylamino-ethyl)-aminomethyl-α-(4-chlorophenyl)-benzylalcohol,
2-(2-methylacetylamino-ethyl)-aminomethyl-α-(4-chlorophenyl)-benzylalcohol,
2-[1-(methylamino)-ethyl]-α-(4-chlorophenyl)-benzylalcohol,
2-[1-(methylamino)-butyl]-α-(4-chlorophenyl)-benzylalcohol,
2-(N-methyl-N-ethoxycarbonyl)-aminomethyl-α-(4-chlorophenyl)-benzylalcohol,
2-(N-methyl-N-ethoxy-carbonyl)-aminomethyl-α-(4-fluorophenyl)-benzylalcohol, 2-methylaminomethyl-α-(4-chlorobenzyl)-benzylalcohol,
2-methylaminomethyl-α-cyclohexen-(1)-yl-benzylalcohol,
2-(N-methyl-N-acetyl)-aminomethyl-α-(4-chlorophenyl)-O-acetyl-benzylalcohol,
2-(N-methyl-N-acetyl)-aminomethyl-α-(4-fluorophenyl)-O-acetyl-benzylalcohol,
2-methylaminomethyl-α-(4-chlorophenyl)-benzyl-ethyl-ether,
2-(N-methyl-N-acetyl)-aminomethyl-α-(3-trifluoromethyl)-(4-chlorophenyl)-O-acetyl-benzylalcohol,
2-[2-(N,N-dimethyl-hydrazino)-ethyl]-aminomethyl-α-(4-chlorophenyl)-benzylalcohol,
2-aminomethyl-α-(4-chlorophenyl)-benzylalcohol,
2-n-butylaminomethyl-α-(4-chlorobenzyl)-benzylalcohol,
2-isobutylaminomethyl-α-(4-chlorobenzyl)-benzylalcohol,
2-isopropylaminomethyl-2-(4-chlorobenzyl)benzylalcohol,
2-ethoxycarbonylaminomethyl-α-(4-chlorophenyl)-O-ethoxycarbonyl-benzylalcohol,
2-aminomethyl-5-chloro-α-phenyl-benzylalcohol,
2-methylaminomethyl-α-methyl-α-(4-chlorophenyl)-benzylalcohol,
2-methylaminomethyl-α-(4-methylmercaptophenyl)-benzylalcohol.

The compounds of general Formula II, used as starting materials in method A, may be prepared according to known methods, for instance, by treating an O-acylbenzoic acid with zinc dust and acetic acid while heating.

Compounds of general Formula IVa may be prepared by the known conversion of the amino group of an α-amino benzophenone into the cyano group according to the Sandmeyer reaction.

Isoindolines of general Formula V are prepared by Grignard reaction of a phthalimide with a compound of the formula Z—Mg—Hal, wherein Z has the same meanings as the Formula I and Hal is halogen, followed by reduction of the resulting 1-hydroxy-3-oxoisoindoline.

The following examples further illustrate the present invention and will enable others skilled in the art to understand it more completely. It should be understood, however, that the invention is not limited solely to the particular examples given below.

EXAMPLE 1

Preparation of 2-methylaminomethyl-α-(4'-chlorophenyl)-benzylalcohol hydrochloride by Method A (a) 12.3 gm. (0.05 mol) of 3-(4-chlorophenyl)-phthalide were dissolved in 500 ml. of benzene saturated with methylamine. The solution was kept in a 1-liter round-bottom flask equipped with a calcium chloride tube for 48 hours at room temperature, and was then evaporated in a water aspirator vacuum to dryness. The residual 2-methylaminocarbonyl - α - (4 - chlorophenyl) - benzylalcohol was recrystallized from ethanol/petroleum ether; M.P. 150–152° C.; yield: 13.2 gm. (97% of theory).

(b) A solution of 13.2 gm. (0.048 mol) of the above product in a mixture of 100 ml. of tetrahydrofuran and 50 ml. of ether, were added to a refluxing suspension of 3.8 gm. (0.1 mol) of lithium aluminum hydride in 200 ml. of ether, and the mixture was refluxed for 3 hours. After cooling, the excess lithium aluminum hydride was destroyed with an excess of an aqueous potassium hydroxide solution. The solids were removed by filtration, the ether phase was dried over magnesium sulfate and filtered, and the ether was removed in a water aspirator vacuum. The residue was dissolved in ethanol, and hydrogen chloride was introduced into the solution, under cooling, until slightly acidic reaction.

The reaction product crystallized out upon addition of ether and was recrystallized from ethanol/ether. 9.3 gm. (71% of theory) of the compound, M.P. 224–227° C., of the formula

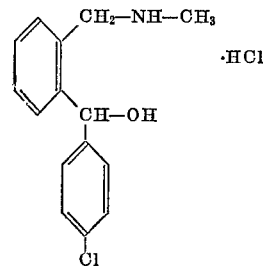

were obtained.

EXAMPLE 1a 2-(N-methyl-N-ethoxycarbonyl)aminoethyl-α-(4'-chlorophenyl)-benzylalcohol 5.1 gm. of 2 - (methylaminomethyl) - α - (4' - chlorophenyl)-benzylalcohol were dissolved in 50 ml. of dry pyridine, and 2.1 gm. of ethyl chloroformate were added, while externally cooling. The mixture was allowed to stand at room temperature for 24 hours and was then evaporated to dryness. The residue was dissolved in ethylacetate, and the solution was washed first with dilute hydrochloric acid, then with water and then sodium carbonate solution, and finally dried over magnesium sulfate. The solvent was removed in vacuo, and the oily residue crystallized from cyclohexane/petroleum-ether (40–60° C.) upon scratching. 3.6 gm. (55% of theory) of the compound, M.P. 87–88° C., of the formula

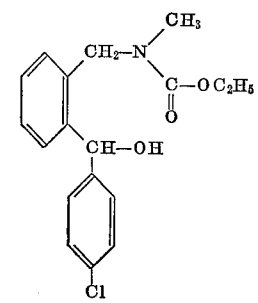

were obtained.

EXAMPLE 1b 2-(dimethylaminomethyl)-α-(4'-chlorophenyl)-benzylalcohol hydrochloride A mixture of 12 gm. of 2-(methylaminomethyl)-α-(4'-chlorophenyl)-benzylalcohol, 5 mg. of an aqueous 40% formaldehyde solution and 40 ml. of 98% formic acid was refluxed for 15 minutes. After cooling, the mixture was poured over a mixture of ice and concentrated ammonia, and the reaction product was extracted with three 100 ml.-portions of ether. The combined ether extracts were washed with water, dried over magnesium sulfate and evaporated to dryness. The residue was transformed into the hydrochloride with ethereal hydrochloric acid and recrystallized from ethanol/ether. 11.5 gm. (80% of theory) of the compound, M.P. 203° C., of the formula

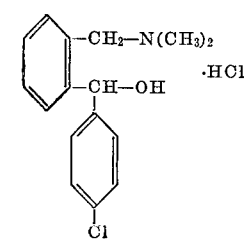

were obtained.

EXAMPLE 1c 2-(methylaminomethyl)-α-(4'-chlorophenyl)-O-ethyl-benzylalcohol hydrochloride A solution of 6 gm. of 2-(methylaminomethyl)-α-(4'-chlorophenyl)-benzylalcohol hydrochloride in 200 ml. ethanol was saturated with hydrogen chloride at room temperature and then refluxed for one hour. The solution was allowed to stand at 0° C. for 12 hours, and the crystalline precipitate formed thereby was collected and recrystallized from water. 4.5 gm. (69% of theory) of the compound, M.P. 231° C., of the formula

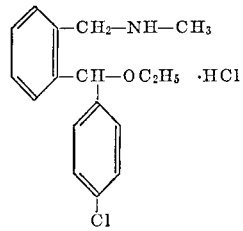

were obtained.

EXAMPLE 2

Preparation of 2-(methylaminomethyl)-α-(4'-bromophenyl)-benzylalcohol hydrochloride by Method A (a) 17 gm. of 3-(4-bromophenyl)-phthalide were dissolved in 500 ml. of benzene. Methylamine was introduced into the solution through a sintered glass frit for 1½ hours at 10° C. The mixture was allowed to stand at room temperature for 3 days. Thereafter, the major part of the solvent was removed in vacuo, and the residue was recrystallized from ether/petroleum ether. 18.5 gm. (98% of theory) of pure 2-methylaminocarbonyl-α-(4'-bromophenyl)-benzylalcohol, M.P. 144–145° C., were obtained.

(b) A solution of 18.5 gm. of the above product in a mixture of 100 ml. of tetrahydrofuran and 50 ml. of ether was added to a refluxing suspension of 3.8 gm. of lithium aluminum hydride in 200 ml. of ether. The mixture was refluxed for 3 hours. After cooling, the excess lithium aluminum hydride was destroyed with an excess of an aqueous potassium hydroxide solution. The solids were removed by filtration, and the ether phase was dried over magnesium sulfate and filtered. The ether was removed in vacuo. The residue was dissolved in ethanol, and hydrogen chloride was introduced until slightly acidic reaction, while cooling.

The product was recrystallized from methanol/ether. 12.7 gm. (65% of theory) of the compound, M.P. 206–207° C., of the formula

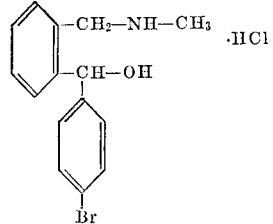

were obtained.

EXAMPLE 3

Preparation of 2-(cyclohexylaminomethyl)-α-(4'-chlorophenyl)-benzylalcohol hydrochloride by Method A 13.5 gm. of 3-(4'-chlorophenyl)-phthalide were heated with 17 gm. of cyclohexylamine at 180° C. for 6 hours. After cooling, the mixture was poured into a mixture of excess 4 N hydrochloric acid and ice, and extracted with ether. The combined ether extracts were dried over sodium sulfate and evaporated to dryness. The residue (15 gm.) was dissolved in 150 ml. of tetrahydrofuran and added to a refluxing suspension of 5 gm. lithium aluminum hydride in 500 ml. of tetrahydrofuran. The mixture was refluxed for 3 hours. After cooling, the excess lithium aluminum hydride was destroyed with an excess of an aqueous potassium hydroxide solution. The solids were removed by vacuum filtration and washed repeatedly with tetrahydrofuran. The filtrate and the washings were combined and evaporated to dryness in vacuo. The residue was distributed between 2 N hydrochloric acid and chloroform. The aqueous phase was made alkaline with a saturated aqueous sodium carbonate solution, and the base was extracted with chloroform. The chloroform extracts were dried over sodium sulfate and evaporated to dryness. The residue was dissolved in ethanol, the solution was acidified with ethereal hydrochloric acid, and the precipitate was recrystallized from ethanol/petroleum ether. 9.6 gm. (47% of theory) of the compound, M.P. 198–201° C., of the formula

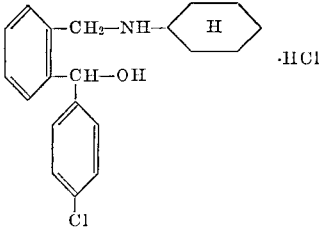

were obtained.

EXAMPLE 4

Preparation of 2-(benzylaminomethyl)-α-(4'-chlorophenyl)-benzylalcohol hydrochloride by Method A (a) A solution of 24.4 gm. of 3-(4'-chlorophenyl)-phthalide and 40 gm. benzylamine in 150 ml. of ethanol was allowed to stand at room temperature for 10 days. Thereafter, the ethanol was removed in vacuo, and the residue was distributed between ether and excess 4 N hydrochloric acid. The ether extract was dried and evaporated to dryness in vacuo. The residue was recrystallized from ethanol/petroleum ether. Yield: 22.5 gm. (64% of theory) of 2-benzylaminocarbonyl-α-(4'-chlorophenyl)-benzlalcohol, M.P. 108–110° C.

(b) 11 gm. of the above product were dissolved in 150 ml. of tetrahydrofuran, and the solution was added dropwise to a refluxing suspension of 5 gm. of lithium aluminum hydride in 500 ml. of tetrahydrofuran. The mixture was refluxed for 3 hours. The excess lithium aluminum hydride was destroyed with an excess of an aqueous potassium hydroxide solution. The solids were removed by vacuum filtration and washed repeatedly with tetrahydrofuran. The filtrate and the washings were combined and evaporated to dryness in vacuo. The residue was chromatographed on silicagel. After elution with benzene/20% chloroform, a substance was isolated, which was recrystallized from ethanol/petroleum ether after addition of ethereal hydrochloric acid. 4.9 gm. (42% of theory) of the compound, M.P. 239–243° C., of the formula

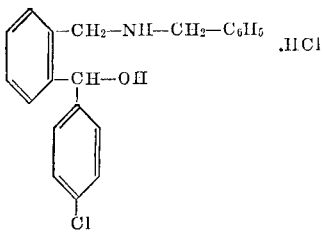

were obtained.

EXAMPLE 5

2-aminomethyl-α-phenyl-benzylalcohol hydrochloride 8 gm. of 2-benzylaminomethyl-α-(4'-chlorophenyl)-benzylalcohol, prepared according to Example 4, were dissolved in 600 ml. of ethanol, 2 gm. palladized charcoal (5%) were added, and the mixture shaken in an atmosphere of hydrogen at room temperature. After completion of hydrogen absorption, which was the case after about 48 hours, the catalyst was removed by filtration, and the solution was evaporated in vacuo to dryness. The resulting residue was chromatographed on a silicagel column, using chloroform:methanol:ammonia (90:9,5: 0.5) as the eluant. The main fraction was converted to the hydrochloride and recrystallized from ethanol/ether. 3.5 gm. (59% of theory) of the compound, M.P. 216° C., of the formula

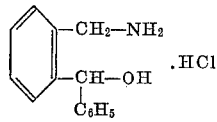

were obtained.

EXAMPLE 6

Preparation of 2-(methylaminomethyl)-α-(3'-trifluoromethylphenyl)-benzylalcohol hydrochloride by Method A (a) 15 gm. of 3-(3'-trifluoromethylphenyl)-phthalide were dissolved in ethanol saturated with methylamine, and the solution was allowed to stand for one hour at 20° C. The solution was then evaporated to dryness, and the residue, 2-methylaminocarbonyl-α-(3'-trifluoromethylphenyl)-benzylalcohol, was recrystallized from benzene/petroleum ether. Yield: 15 gm. (90% of theory), M.P. 99–100° C.

(b) 14.3 gm. of the above product were dissolved in 100 ml. of tetrahydrofuran, and the solution was added dropwise to a cooled and stirred solution of 3.5 gm. of lithium aluminum hydride in 100 ml. of dry tetrahydrofuran. The mixture was then stirred and refluxed for 3 hours, cooled again, the excess lithium aluminum hydride was decomposed by dropwise addition of water, and the reaction mixture was vacuum filtered to remove the inorganic precipitate. The filtrate was dried over magnesium sulfate and evaporated to dryness in vacuo. The residue was transformed into the hydrochloride by addition of ethereal hydrochloric acid, and the salt was recrystallized from ethanol/ether/petoleum ether. 8.0 gm. (53% of theory) of the compound, M.P. 160–162° C., of the formula

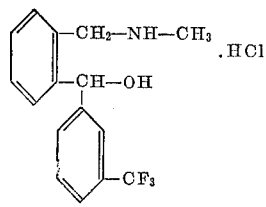

were obtained.

EXAMPLE 7

Preparation of 2-(β-hydroxyethtylaminomethyl)-α-(4'-chlorophenyl)-benzylalcohol hydrochloride by Method A (a) A mixture of 50 gm. of 3-(4'-chlorophenyl)-phthalide and 100 ml. of ethanolamine was refluxed for seven hours. Thereafter, the reaction mixture was dissolved in ethylacetate, and the solution was washed successively with water, 2 N HCl, and a saturated aqueous sodium carbonate solution, and dried over magnesium sulfate and evaporated to dryness. The residue was recrystallized from ethyl acetate/petroleum ether. Yield: 35 gm. (56% of theory), of 2-(β-hydroxyethylamino-carbonyl)-α-(4'-chlorophenyl) - benzylalcohol, M.P. 98–100° C.

(b) 8 gm. of the above product were dissolved in 200 ml. of dry tetrahydrofuran, and 3 gm. of lithium aluminum hydride were added to the solution while stirring and in an atmosphere of nitrogen. The mixture was then refluxed, while stirring, for 17 hours. While cooling, the excess lithium alanate was destroyed by dropwise addition of water; the mitxure was vacuum filtered, and the inorganic residue was washed with ether several times. The combined organic filtrates were dried and evaporated to dryness in vacuo. The oily residue was transformed into the hydrochloride by addition of ethereal hydrochloric acid and recrystallized from ethanol/ether. Yield: 4.5 gm. (42% of theory) of the compound, M.P. 157–161° C., of the formula

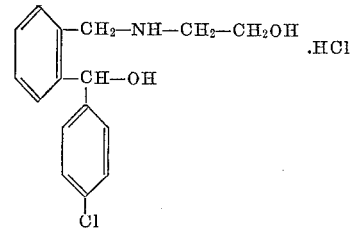

EXAMPLE 8

Preparation of 2-methylaminomethyl-α-phenyl-benzyl alcohol hydrochloride by Method A (a) 42 gm. of 3-phenyl-phthalide were dissolved in 1500 ml. of ethanol. The solution was saturated with methylamine while cooling with ice, and was allowed to stand at room temperature for four days. Thereafter, the solvent was removed in vacuo, and the residue, 2-methylaminocarbonyl-α-phenyl-benzylalcohol, was recrystallized from ethanol/petroleum ether. Yield: 41.5 gm. (74.5% of theory).

(b) 41.5 gm. of the above product were dissolved in 150 ml. of tetrahydrofuran, and the solution was added dropwise to a refluxing suspension of 16 gm. of lithium aluminum hydride in 350 ml. of tetrahydrofuran. The mixture was refluxed for 6 hours. The excess lithium aluminum hydride was destroyed with an excess of an aqueous potassium hydroxide solution. The solids were removed by vacuum filtration and washed repeatedly with tetrahydrofuran. The filtrate and the washings were combined, dried over potassium carbonate and evaporated to dryness in vacuo. The residue was dissolved in ethanol, and hydrogen chloride was introduced into the solution while cooling with ice. The crystals which separated out were recrystallized from ethanol. Yield: 28.7 gm. (73% of theory) of 2-methylaminomethyl-α-phenyl-benzylalcohol hydrochloride, M.P. 224–225° C.

EXAMPLE 9

Preparation of 2 - [β - (N,N - dimethylhydrazino)-ethylaminomethyl] - α - (4'-chlorophenyl) - benzylalcohol hydrochloride by Method A 24.4 gm. of 3-(4'-chlorophenyl)-phthalide were dissolved in 100 ml. of benzene, and 15.5 gm. of (β-N,N-dimethylhydrazinoethyl)-amine were added. The mixture was allowed to stand at room temperature for 8 days. Thereafter, the solvent was removed in vacuo. The residue was dissolved in 150 ml. of tetrahydrofuran, and the solution was added dropwise to a refluxing suspension of 16 gm. of lithium aluminum hydride in 350 ml. of tetrahydrofuran. The mixture was refluxed for 9 hours, and was then allowed to stand at room temperature for 4 days. The excess lithium aluminum hydride was destroyed with an excess of an aqueous potassium hydroxide solution. The solids were removed by vacuum filtration, and the filter cake was washed repeatedly with tetrahydrofran. The filtrate and the washings were combined and extracted 3 times with 100 ml. of 2 N HCl. The acidic fractions were made alkaline with an excess of an aqueous saturated sodium carbonate solution and repeatedly extracted with ether. The combined ether extracts were dried over potassium carbonate and evaporated to dryness in vacuo. The residue was dissolved in ethanol, and hydrogen chloride was introduced into the solution while cooling with ice. Upon addition of ether, crystals separated out which were recrystallized from ethanol/ether. Yield: 16.1 gm. (40% of theory) of the compound, M.P. 184–187° C., of the formula

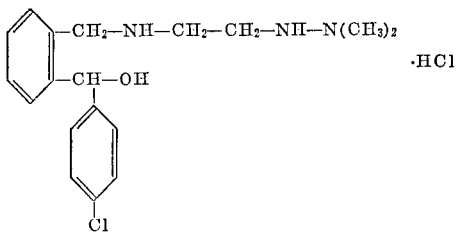

EXAMPLE 10

Preparation of 2-methylaminomethyl-α-cyclohexen-(1)-yl-benzylalcohol hydrochloride by Method A (a) 50 gm. of 3-[cyclohexen-(1)-yl]-phthalide were dissolved in a mixture of 750 ml. of benzene and 500 ml. of ethanol. The solution was saturated with methylamine while cooling with ice. The mixture was allowed to stand at room temperature for 7 days. The solvents were removed in vacuo, and the residue, 2-methylaminocarbonyl-α-cyclohexen-(1)-yl-benzylalcohol, was recrystallized from ether/petroleum ether. Yield: 45 gm. (78% of theory), M.P. 102–106° C.

(b) 36 gm. of the above product were dissolved in 200 ml. of tetrahydrofuran, and the solution was added dropwise to a refluxing suspension of 17 gm. of lithium aluminum hydride in 500 ml. of tetrahydrofuran. The mixture was refluxed for 12 hours. The excess of lithium aluminum hydride was destroyed with an excess of an aqueous potassium hydroxide solution. The solids were removed by vacuum filtration and washed repeatedly with tetrahydrofuran. The filtrate and the washings were combined and evaporated to dryness in vacuo. The resulting residue was dissolved in ethanol, and hydrogen chloride was introduced into the solution while cooling with ice. Upon addition of ether, crystals separate out which were recrystallized from ethanol ether. Yield: 28 gm. (72% of theory) of the compound, M.P. 161–163° C., of the formula

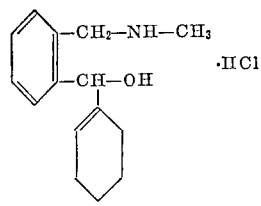

EXAMPLE 11

Preparation of 2-methylaminomethyl-α-(4'-chlorobenzyl)-benzylalcohol by Method A (a) 35 gm. of 3-(4'-chlorobenzyl)-phthalide were dissolved in 1000 ml. of ethanol. The solution was saturated with methylamine while cooling with ice. After the mixture was allowed to stand for 3 days at room temperature, methylamine was again introduced to saturation while cooling with ice. After standing another week at room temperature, the solvent was removed in vacuo. The residual 2 - methylaminocarbonyl-α-(4'-chlorobenzyl)-benzylalcohol was recrystallized from ethanol/petroleum ether. Yield: 24.8 gm. (63.5% of theory).

(b) 17 gm. of the above product were dissolved in 200 ml. of tetrahydrofuran, and the solution was added dropwise to a refluxing suspension of 12 gm. of lithium aluminum hydride in 600 ml. of tetrahydrofuran. The mixture was refluxed for 10 hours. The excess lithium aluminum hydride was destroyed with an excess of an aqueous potassium hydrodie solution. The solids were removed by vacuum filtration and washed repeatedly with tetrahydrofuran. The filtrate and the washings were combined, dried over potassium carbonate and evaporated to dryness in vacuo. The resulting residue was recrystallized from ethanol/petroleum ether. Yield: 10.2 gm. (63.5% of theory) of 2 - methylaminomethyl-α-(4'-chlorobenzyl)-benzylalcohol, M.P. 98–100° C., of the formula

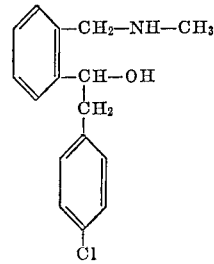

EXAMPLE 12

Preparation of 2 - [(N - methyl - N - acetyl)-aminomethyl] - α - (4' - chlorophenyl) - O - acetyl-benzylalcohol by Method B 66 gm. of 1-(4' - chlorophenyl) - N - methylisoindoline were dissolved in 700 ml. of acetic acid anhydride, and the solution was refluxed for 24 hours. The major part of the excess acetic acid anhydride was then removed by evaporation in vacuo, and the concentrated solution was allowed to stand at 0° C. for crystallization. The precipitated compound was vacuum filtered off, washed with ether and dried. Yield: 76.5 gm. (81.6% of theory) of the compound, M.P. 135° C., of the formula

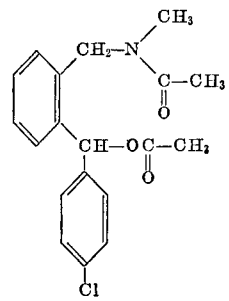

EXAMPLE 13

Preparation of 2 - (methylaminomethyl) - α - (4' - chlorophenyl)-benzylalcohol hydrochloride by Method B A mixture of 187 gm. of 2-[(N-methyl - N - acetyl)-aminomethyl] - α - (4' - chlorophenyl) - O - acetyl-benzylalcohol, obtained according to Example 12, 500 ml. of an aqueous 50% potassium hydroxide solution and 1200 ml. of ethyleneglycol was refluxed for 8 hours. After cooling, the solution was diluted with 3000 gm. of ice and extracted with five 500 ml. portions of ethylacetate. The combined ethylacetate extracts were washed with aqueous sodium carbonate solution, dried over magnesium sulfate and evaporated to dryness. The residue was dissolved in ethanol, and ethereal hydrochloric acid was added to precipitate the hydrochloride. The salt was recrystallized from ethanol and had a melting point of 226–227° C. Yield: 135 gm. 84% of theory) of the compound of the formula

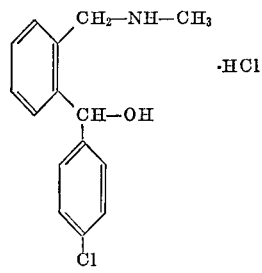

EXAMPLE 14

Preparation of 2 - [(N - methyl - N - acetyl) - aminomethyl]-α-(4'-fluorophenyl) - O - acetyl-benzylalcohol by Method B 50 gm. of 1 - (4' - fluorophenyl) - N - methyl-isoindoline were dissolved in 500 ml. of acetic acid anhydride, and the solution was refluxed for 16 hours. The major part of the excess acetic acid anhydride was then removed by evaporation in vacuo, and the concentrated solution was allowed to stand at 0° C. for crystallation. The crystalline compound was vacuum filtered off, washed with ether and dried. It had a melting point of 106° C. Yield: 51.7 gm. (71.5% of theory) of the compound of the formula

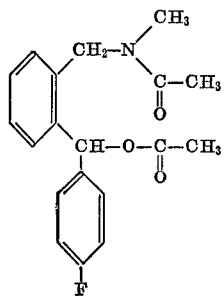

EXAMPLE 15

Preparation of 2 - methylaminomethyl - α - (4' - fluorophenyl)-benzylalcohol hydrochloride by Method B A mixture of 50 gm. of 2-[(N-methyl-N-acetyl)-aminomethyl] - α - (4' - fluorophenyl) - O - acetyl-benzylalcohol, obtained according to Example 14, 125 ml. of aqueous 50% potassium hydroxide and 250 ml. of ethyleneglycol was refluxed for 1 hour. After cooling, the solution was diluted with 1000 gm. of ice and extracted with five 200 ml.-portions of ether. The combined ether extracts were washed with an aqueous sodium carbonate solution, dried over magnesium sulfate and evaporated to dryness. The residue was dissolved in ethanol, and ethereal hydrochloric acid was added to the solution to precipitate the hydrochloride. The salt was recrystallized from ethanol and had a melting point of 231° C. Yield: 31.2 gm. 73% of theory) of the compound of the formula

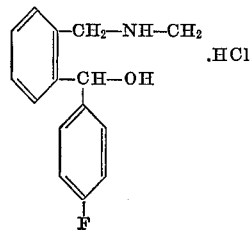

EXAMPLE 15a

Using a procedure analogous to that described in Example 1a, 4 gm. (53% of theory) of pure 2-(N-methyl-N-ethoxycarbonyl-amino) - α - (4' - fluorophenyl)-benzylalcohol were obtained from 5.8 gm. of 2-methylaminomethyl-α-(4'-fluorophenyl - benzylalcohol. The product was a non-crystallizable oil, but showed the IR- and NMR-spectrum value anticipated from those of the corresponding 4-chlorophenyl analog.

EXAMPLE 16

Preparation of 2-(methylaminomethyl)-α-(2'-chlorophenyl)-benzylalcohol hydrochloride by Method B A mixture of 12 gm. of 1-(2-chlorophenyl)-2-methylisoindoline and 100 ml. of acetic acid anhydride was refluxed for five days. The acetic acid anhydride was then removed in vacuo, and the residue was triturated with dilute aqueous ammonia and extracted with five 50 ml. portions of ether. The combined ether extracts were washed consecutively with dilute hydrochloric acid, water and a saturated aqueous sodium carbonate solution, dried and evaporated to dryness. The residue, consisting of 15 gm. of a dark brown oil, was dissolved in 70 ml. of ethyleneglycol and 35 ml. of aqueous 50% potassium hydroxide, and the solution was refluxed for 2 hours. The mixture was then diluted with 200 gm. of ice and extracted with three 100 ml. portions of ether. The combined ether extracts were washed with water, dried and evaporated to dryness. The residue was dissolved in ethanol and neutralized with ethereal hydrochloric acid. The precipitate was recrystallized from ethanol/ether. Yield: 9 gm. (61% of theory) of the compound, M.P. 205° C., of the formula

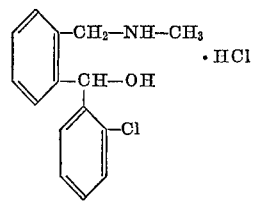

EXAMPLE 16a

Using a procedure analogous to that described in Example 16, 25 gm. (29% of theory) of 2-methylaminomethyl-α-(3'-chloro-phenyl)-benzylalcohol hydrochloride, M.P. 174° C., were obtained from 70 gm. of 1-(3'-chloro-phenyl)-2-methylisoindoline.

EXAMPLE 17

Preparation of 2-(n-butylaminomethyl)-α-(4'-chlorophenyl)-benzylalcohol hydrochloride by Method B A mixture of 10 gm. of 1-(4'chlorophenyl)-2-n-butyl-isoindoline and 100 ml. af acetic acid anhydride was refluxed for 30 hours. The acetic acid anhydride was then removed in vacuo, and the residue was treated with water and dilute ammonia. The organic material was then extracted with three 100 ml. portions of ether. The combined ether extracts were washed consecutively with dilute hydrochloric acid, water and an aqueous saturated sodium carbonate solution, dried and evaporated to dryness. The dark brown, oily residue was purified on a silicagel column in the usual manner, using a chloroform:methanol:ammonia mixture (97:3:0.5% by volume) as eluant. The main fraction consisted of 6 gm. of a light yellow oil, which was used as such for the following reaction.

A mixture of 6 gm. of the oil obtained by the above procedure, 30 ml. of ethyleneglycol and 15 ml. of aqueous 50% potassium hydroxide was refluxed for 6 hours, cooled to room temperature and diluted with 100 ml. water. The mixture was extracted with three 50 ml. portions of ether, and the combined ether extracts were washed with water, dried and evaporated to dryness. The residue was converted into the hydrochloride by neutralization with ethereal hydrochloric acid, and the crystalline precipitate recrystallized from ethanol/ether. Yield: 3.2 gm. (27% of theory) of the compound, M.P. 102–105° C., of the formula

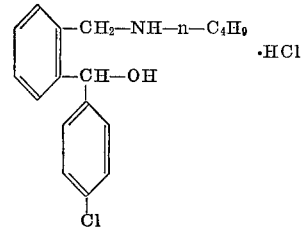

EXAMPLE 18

Preparation of 2-(isobutylaminomethyl)-α-(4'-chlorophenyl)-benzylalcohol hydrochloride by Method B A mixture of 18 gm. of 1-(4'-chlorophenyl)-2-isobutyl-isoindoline and 180 ml. of acetic acid anhydride was refluxed for 15 hours. The solution was concentrated to a volume of about 50 ml. of evaporation under reduced pressure and then poured over a mixture of ice and ammonia. The diacetyl compound was extracted with ether, the combined ether extracts were washed consecutively with acid, water and an aqueous saturated sodium carbonate solution, dried over magnesium sulfate and finally evaporated to dryness. The resulting 17 gm. of dark oil were dissolved in 90 ml. ethylene-glycol, and after addition of 45 ml. of aqueous 50% potassium hydroxide the mixture was refluxed for 10 hours. After dilution with 200 gm. of ice the reaction mixture was extracted with three 200 ml. portions ether, the combined ether extracts were washed with 100 ml. water, dried and evaporated to dryness. The residue was purified by chromatography on 600 gm. of silicagel, using a mixture of 90 parts benzene and 10 parts methanol as eluant. The purified material was dissolved in ether and precipitated with ethereal hydrochloric acid. The solid was recrystallized from ethanol-ether. Yield: 6 gm. (28% of theory) of 2-(isobutyl-aminomethyl)-α-(4'-chlorophenyl)-benzylalcohol hydrochloride, M.P. 154° C.

EXAMPLE 19

2-(N-methyl-N-acetyl)-aminomethyl-α-(3'-trifluoromethyl-4'-chlorophenyl)-O-acetyl-benzylalcohol A mixture of 10 gm. of 1-(3'-trifluoromethyl-4'-chlorophenyl)-2-methyl-isoindoline and 100 ml. acetic acid anhydride was refluxed for one week. Then, the major part of the acetic acid anhydride was removed in vacuo, and the residue was treated with ice and ammonia and extracted with ether. The ether solution was washed consecutively with water, dilute hydrochloric acid and an aqueous sodium carbonate solution, dried over magnesium sulfate, and the solvent was evaporated in vacuo. 12.5 gm. of a dark oil remained, which was identified to be the compound of the formula

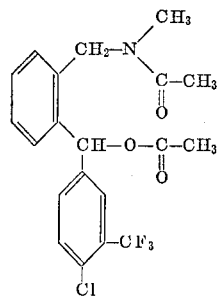

EXAMPLE 20

2-methylaminomethyl-α-(3-trifluoromethyl-4-chlorophenyl)-benzylalcohol hydrochloride A mixture of 12.5 gm. of 2-(N-methyl-N-acetyl)-aminomethyl - α - (3'-trifluoromethyl-4'-chlorophenyl)-O-acetylbenzylalcohol, 40 ml. of aqueous 50% potassium hydroxide and 120 ml. ethyleneglycol was refluxed for 2 hours. The mixture was then diluted with 200 ml. of water and acidified with concentrated hydrochloric acid. The precipitate formed thereby was collected and recrystallized twice from ethanol/ether. Yield: 7 gm. (69% of theory) of the compound, M.P. 253° C., of the formula

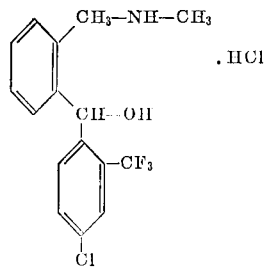

EXAMPLE 21

Preparation of 2-(N-methyl-N-acetyl)-aminomethyl-α-(4'-methylphenyl)-O-acetyl-benzylalcohol by Method B A mixture of 36 gm. of 1(4'-methylphenyl)-2-methyl-isoindoline and 360 ml. of acetic acid anhydride was refluxed for 30 hours. Thereafter, about 300 ml. of acetic acid anhydride were distilled off under reduced pressure, and the residue was poured on a mixture of ice and concentrated ammonia. The diacetyl compound was extracted with five 100-ml.-portions of ether, the combined ether extracts were washed successively with dilute hydrochloric acid, water and an aqueous sodium carbonate solution, and then dried over magnesium sulfate. The ether was evaporated and the crystalline residue was recrystallized from ethanol. Yield: 33 gm. (63% of theory) of the compound, M.P. 96° C., of the formula

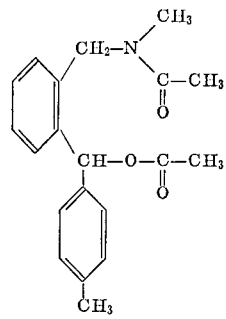

EXAMPLE 22

2-(methylaminomethyl)-α-(4'-methylphenyl)-benzylalcohol hydrochloride 20 gm. of 2-(N-methyl-N-acetyl)-aminomethyl-α-(4'-methylphenyl) - O - acetyl-benzylalcohol were refluxed for two hours in a mixture of 120 ml. of ethyleneglycol and 60 ml. of aqueous 50% potassium hydroxide. Thereafter, the solution was diluted with 300 ml. of water and extracted twice with ether. The ether extracts were washed with water, dried over magnesium sulfate and evaporated to dryness in vacuo. The residue crystallized upon treatment with ethereal hydrochloric acid, and the crystalline product was recrystallized from ethanol/ether. Yield: 13 gm. (77% of theory) of 2-(methylaminomethyl)-α-(4'-methyl-phenyl)-benzylalcohol hydrochloride, M.P. 218–219° C.

EXAMPLE 23

2-ethylaminomethyl-α-(4'-chlorophenyl)-benzylalcohol hydrochloride 18.5 gm. of 2-ethylaminocarbonyl-α-(4'-chlorophenyl)-benzylalcohol, prepared analogous to Example 2a, were dissolved in 120 ml. of dry tetrahydrofuran, and the solution was added dropwise, while cooling and in an atmosphere of nitrogen, into a stirred solution of 5 gm. of lithium aluminum hydride in 120 ml. of tetrahydrofuran. After the initially vigorous reaction subsided, the mixture was refluxed for 6 hours, the cooled, the unreacted lithium aluminum hydride was decomposed by addition of water, the inorganic material precipitated thereby was separated by filtration, and the filtrate was dried over magnesium sulfate and evaporated to dryness. The oily residue was dissolved in ether, and the solution was neutralized with ethereal hydrochloric acid. The crystalline precipitate formed thereby was recrystallized from methanol/ether.

Yield: 13.0 gm. (65% of theory) of the compound, M.P. 209° C., of the formula

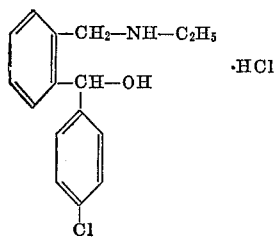

EXAMPLE 24

2-methylaminomethyl-α-(4'-methylmercaptophenyl)-benzylalcohol hydrochloride 13.5 gm. of 2-methylaminocarbonyl-α-(4'-methylmercaptophenyl)-benzylalcohol, prepared analogous to Example 2a, were reduced as described in Example 23, wtih 4.5 gm. of lithium aluminum hydride, and the reaction product was crystallized as the hydrochloride. Yield: 9.0 gm. (62% of theory) of the compound, M.P. 184° C., of the formula

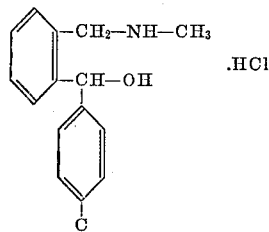

EXAMPLE 25

Preparation of 2-n-butylaminomethyl-α-(4'-chlorobenzyl)-hydrochloride by Method A 27 gm. of 3-(4'-chlorobenzyl)-phthalide were dissolved by mechanical stirring in 100 ml. of n-butyl-amine, and the solution was allowed to stand at room temperature overnight. Thereafter, the clear solution was evaporated to dryness in vacuo. The remaining 2-n-butylaminocarbonyl-α-(4'-chlorobenzyl)-benzylalcohol was crystallized from ether/petroleum ether. Yield: 31.5 gm. (91% of theory), M.P. 110–112° C. The amide thus obtained (31.5 gm.) was dissolved in 100 ml. of tetrahydrofuran, and the solution was added dropwise into a refluxing suspension of 11.4 gm. of lithium aluminum hydride in 250 ml. of ether. The mixture was refluxed for 25 hours. Thereafter, the excess lithium aluminum hydride was destroyed with an excess of an aqueous sodium hydroxide solution. The solids were removed by vacuum filtration, and the filter cake was repeatedly washed with tetrahydrofuran. The filtrate and the washings were combined, dried over potassium carbonate, and evaporated to dryness in vacuo. The residue was dissolved in ethanol and converted into the hydrochloride by the addition of ethereal hydrochloric acid. The hydrochloride crystallized out upon addition of petroleum ether and was recrystallized from ethanol/petroleum ether and was recrystallized from ethanol/petroleum ether. Yield: 14.6 gm. (44% of theory) of 2-(n-butylaminomethyl) - α - (4' - chlorobenzyl)-benzylalcohol hydrochloride, M.P. 119.5–122° C.

EXAMPLE 26

Preparation of 2-isobutylaminomethyl-α-(4'-chlorobenzyl)-benzylalcohol hydrochloride by Method A 50 gm. of 3-(4'-chlorobenzyl)-phthalide were dissolved in 200 ml. of isobutylamine, and the solution was allowed to stand at room temperature overnight. Thereafter, the clear solution was evaporated to dryness in vacuo. Yield: 53 gm. (83% of theory) of 2-isobutylaminocarbonyl-α-(4'-chlorobenzyl)-benzylalcohol. The amide thus obtained 58 gm. (83% of theory) of 2-isobutylaminocarbonyl-α-the solution was added dropwse to a refluxing suspension of 19 gm. of lithium aluminum hydride in 800 ml. of ether. The mixture was refluxed for 16 hours. Thereafter, the excess lithium aluminum hydride was destroyed with an excess of an aqueous sodium hydroxide solution. The solids were removed by vacuum filtration, and the filter cake was repeatedly washed with tetrahydrofuran. The filtrate and the washings were combined, dried over potassium-carbonate, and evaporated to dryness in vacuo. The residue was chromatographed on silicic acid. The reaction product was eluated with 5% methanol/chloroform and then acidified with ethereal hydrochloric acid and recrystallized from isopropanol/ether. Yield: 17.2 gm. (55% of theory) of 2 - isobutylaminomethyl-α-(4'-chlorobenzyl)-benzylalcohol hydrochloride, M.P. 130–132° C.

EXAMPLE 27

Preparation of 2-isopropylaminomethyl-α-4'-chlorobenzyl)-benzylalcohol hydrochloride by Method A 27 gm. of 3-(4'-chlorobenzyl)-phthalide were dissolved in 200 ml. of isopropylamine, and the solution was allowed to stand at room temperature for two weeks. Thereafter, the solution was evaporated to dryness in vacuo, and the residue was recrystallized from methanol/petroleum ether. Yield: 32.5 gm. (98% of theory) of isopropylaminocarbonyl-α-(4' - chlorobenzyl) - benzylalcohol, M.P. 137–139° C. The amide thus obtained (32.5 gm.) was dissolved in 100 ml of tetrahydrofuran, and the solution was added dropwise to a refluxing suspension of 11.4 gm. of lithium aluminum hydride in 250 ml. of ether. The mixture was refluxed for 64 hours. Thereafter, the excess lithium aluminum hydride was destroyed with an excess of an aqueous sodium hydroxide solution. The solids were removed by vacuum filtration and repeatedly washed with tetrahydrofuran. The filtrate and the washings were combined, dried over potassium carbonate and evaporated to dryness in vacuo. The residue was dissolved in methanol, converted into the hydrochloride by addition of etheral hydrochloric acid, and crystallized by addition of ether. The hydrochloride was recrystallized from methanol/ether. Yield: 11.7 gm. (71.5% of theory) of 2-isopropylaminomethyl-α-(4'-chlorobenzyl) - benzylalcohol hydrochloride, M.P. 192–194° C.

EXAMPLE 28

Preparation of 2-methylaminomethyl-α-(4'-chlorophenyl)-α-methyl-benzylalcohol hydrochloride by Method A (a) 2-methylaminocarbonyl - α - (4'-chlorophenyl)-2-methyl-benzylalcohol.—60 gm. of 3-(4'-chlorophenyl)-3-methyl-phthalide were dissolved in 500 ml. of a saturated solution of methylamine in ethanol. After standing for 24 hours at −10° C., the reaction product crystallized out and was vacuum filtered off, washed with cold ethanol/petroleum ether and dried in vacuo. Yield: 58 gm. (90% of theory), M.P. 155–157° C.

(b) 1-(4' - chlorophenyl) - 1,2-dimethyl-3-oxo-isoindoline.—24 gm. of 3-methylaminocarbonyl-α-(4'-chlorophenyl)-α-methyl-benzylalcohol were dissolved, while cooling on an ice bath, in 80 ml. of anhydrous trifluoroacetic acid. The solution was allowed to warm to 20° C. (approximately 30 minutes) and was then evaporated to dryness without heating. The oily residue was triturated with a concentrated aqueous sodium carbonate solution, and the lactam was extracted with ether. The ether solution was dried over magnesium sulfate, filtered and concentrated in vacuo. Ethereal hydrochloric acid was added until no more lactam-hydrochloric acid adduct precipitated. Yield: 20.5 gm. (80% of theory), M.P. 178–182° C.

(c) 2-methylaminomethyl - α - (4' - chlorophenyl)-α-methyl-benzylalcohol hydrochloride.—25 gm. of the above oxo-isoindoline (freshly prepared from the hydrochloric acid adduct by treatment with a sodium carbonate solution and extraction with ether) were dissolved in 250 ml. of dry tetrahydrofuran, and this solution was added dropwise to a stirred suspension of 7 gm. of lithium aluminum hydride in 100 ml. of tetrahydrofuran. After all the lactam had been introduced, the mixture was refluxed for 24 hours, then cooled and decomposed by dropwise addition of water. The inorganic precipitate was filtered off, and the filtrate was evaporated to dryness. The oily residue (20 gm.) consisted of a complex mixture of the reaction products. It was separated on a silica gel column with chloroform/methanol 98.2. The main fraction, which left the column after most of the basic materials had been eluted, was collected and recrystallized as the hydrochloride from ethanol/ether. Yield: 6 gm. (24% of theory) of the compound, M.P. 223–224° C., of the formula

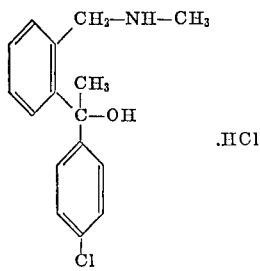

EXAMPLE 29

Preparation of 2-aminomethyl-α-(4′-chlorophenyl)-benzylalcohol hydrochloride by Method A 3.9 gm. of 2-cyano-4′-chlorobenzophenone, M.P. 116–119° C., prepared by the Sandmeyere Reaction from 2-amino-4′-chlorobenzophenone, were dissolved in 100 ml. of tetrahydrofuran, and this solution was added dropwise to a refluxing suspension of 4 gm. of lithium aluminum hydride in 150 ml. of ether over a period of one hour, and the mixture was refluxed for one hour more. The excess lithium aluminum hydride was destroyed with an excess of an aqueous sodium hydroxide solution. The solids were removed by vacuum filtration and repeatedly washed with tetrahydrofuran. The filtrate and the washings were combined, dried over potassium carbonate, and evaporated to dryness in vacuo. The residue was dissolved in a small amount of ethanol, and the solution was acidified with ethereal hydrochloric acid. The hydrochloride crystallized out upon addition of ether, and was recrystallized from ethanol/ether. Yield: 3.9 gm. (82% of theory) of the compound, M.P. 194–196° C., of the formula

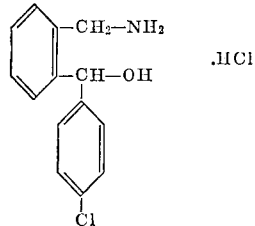

EXAMPLE 30

2-ethoxycarbonylaminomethyl-α-(4′-chlorophenyl)-O-ethoxycarbonyl-benzylalcohol 14.7 gm. of 2-amino-methyl-α-(4′-chlorophenyl)-benzylalcohol were dissolved in 200 ml. of dry pyridine, and 11 ml. of ethylchloroformate were added dropwise to the solution while externally cooling. The mixture was allowed to stand at room temperature for two hours. The pyridine was removed in vacuo, and the residue was chromatographed on silicic acid. The major fractions eluted with 2.5% chloroform/benzene were combined, filtered through a glass sinter funnel, evaporated to dryness and dried in high vacuo. The resulting oil could not be induced to crystallize. Yield: 11.9 gm. (59% of theory) of the compound of the formula

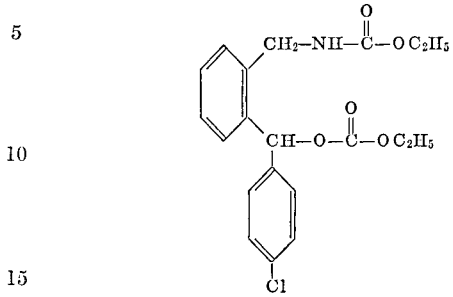

EXAMPLE 31

2-methylaminomethyl-α-(4′-chlorophenyl)-benzylalcohol hydrochloride 11.7 gm. of 2-ethoxycarbonylaminomethyl-α-(4′-chlorophenyl)-O-ethoxycarbonyl-benzylalcohol were dissolved in 100 ml. of ether, and the solution was added dropwise to a refluxing suspension of 4 gm. of lithium aluminum hydride in 200 ml. of ether over a period of one hour. Thereafter, the mixture was refluxed for three hours more. Then, the excess lithium aluminum hydride was destroyed with an excess of an aqueous sodium hydroxide solution. The solids were removed by vacuum filtration and repeatedly washed with ether. The filtrate and the washings were combined, dried over potassium carbonate and evaporated to dryness in vacuo. The remaining resin was dissolved in a small amount of ethanol, and converted into the hydrochloride by addition of ethereal hydrochloric acid. The hydrochloride was recrystallized from ethanol/ether. Yield: 10.2 gm. (92% of theory), M.P. 224–225° C.

EXAMPLE 32

2-aminomethyl-5-chloro-α-phenyl-benzylalcohol hydrochloride 18 gm. of 2-cyano-5-chloro-benzophenone, M.P. 84–85° C., prepared by the Sandmeyer Reaction from 2-amino-5-chloro-benzophenone, were dissolved in 200 ml. of ether, and the solution was added dropwise to a refluxing suspension of 18 gm. of lithium aluminum hydride in 500 ml. of ether over a period of one and a half hours. Thereafter, the excess lithium aluminum hydride was destroyed with an excess of an aqueous sodium hydroxide solution. The solids were removed by vacuum filtration and repeatedly washed with tetrahydrofuran. The filtrate and the washings were combined, dried over potassium carbonate, and evaporated to dryness in vacuo. The residue was dissolved in a small amount of isopropanol, and converted into the hydrochloride by addition of ethereal hydrochloric acid. The hydrochloride crystallized out upon addition of ether, and was recrystallized from isopropanol/ether. Yield: 11.3 gm. (54% of theory) of the compound, M.P. 169–170° C., of the formula

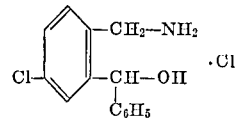

EXAMPLE 33

Separation of 2-methylaminoethyl-α-(4′-chlorophenyl)-benzylalcohol into enantiomers A hot concentrated solution of 90 gm. of di-p-toluoyl-L-tartaric acid in ethanol was added to a hot concentrated solution of 61 gm. of 2-methylaminomethyl-α-(4′-chlorophenyl)-benzylalcohol in ethanol. The mixture was left to crystallize overnight at room temperature. The crystals were removed by vacuum filtration, and the mother liquors were concentrated. A second crystalline fraction was obtained. The first fraction was recrystallized from ethanol. The mother liquors of this fraction were used for the recrystallization of the second fraction. This procedure was systematically repeated four times. The final two crystalline fractions were combined, and the free base was liberated with 2 N sodium hydroxide solution and taken up in ether. After drying the solution and evaporating the ether, the residue was recrystallized four times from ether/petroleum ether. Yield: 13 gm. (43% of theory), M.P. 71–74° C., $[\alpha]_D^{25°} = +78.4°$ (ethanol). The mother liquors of the above recrystallizations were combined, evaporated to dryness, and the base was liberated with 2 N sodium hydroxide and taken up in ether. The ether solution was dried over potassium carbonate and evaporated to dryness. 27 gm. of a resin were obtained. A hot concentrated solution of 40 gm. of di-p-toluoyl-D-tartaric acid in ethanol was added to a hot concentrated solution of the 27 gm. of resin thus obtained in ethanol. The same procedure was repeated as described above for the first enantiomer. Yield: 10.6 gm. (35% of theory), M.P. 71–74° C., $[\alpha]_D^{25°} = -80.1°$ (ethanol).

EXAMPLE 34

2-(N-ethoxycarbonyl)-aminomethyl-5-chloro-α-phenyl-O-ethoxy-carbonyl-benzylalcohol 25 g. of 2 - aminomethyl - 5-chloro-α-phenyl-benzylalcohol, prepared analogous to Example 32, were dissolved in 200 ml. of dry pyridine, 18 ml. of ethylchloroformate were dropped in under external cooling. The mixture remained at room temperature for 2 hours. The pyridine was removed in vacuo and the residue chromatographed on silicic acid. The major fractions eluting with 5% methanol/benzene were combined, charcoalized, filtered through a glass sinter funnel, evaporated to dryness and dried in high vacuo. Yield: 30.1 g. (77%).

EXAMPLE 35

2-(N-ethoxycarbonyl)-aminomethyl-5-chloro-α-phenyl-benzylalcohol 173 g. of 2 - (N-ethoxycarbonyl) - aminomethyl - 5-chloro - α - phenyl-O-ethoxycarbonyl-benzylalcohol, prepared according to Example 34, were dissolved in 25 ml. of 95% ethanolic 2 N sodium hydroxide solution. After 2 hours at room temperature the mixture was diluted with water and adjusted to pH 6 with 1 N hydrochloric acid. The solution was repeatedly extracted with chloroform. The combined chloroform extracts were dried over sodium sulfate and evaporated to dryness in vacuo. The residue was chromatographed on silicic acid. The major fractions eluting with 1% methanol/benzene were combined, charcoalized, filtered through a glass sinter funnel, evaporated to dryness and dried in high vacuo. Yield: 10.7 g. (76%).

EXAMPLE 36

2-methylaminomethyl-5-chloro-α-phenyl-benzylalcohol 12.8 g. of 2 - (N-ethoxycarbonyl)-aminomethyl - 5-chloro - α - phenyl-O-ethoxycarbonyl-benzylalcohol, prepared analogous to Example 34, were dissolved in 100 ml. of ether and added dropwise to a refluxing suspension of 3.8 g. lithiuma luminum hydride in 300 ml. of ether. After one hour the addition was complete and the mixture was refluxed for a further hour. Excess lithium aluminum hydride was destroyed with an excess of a sodium hydroxide solution. The solids were removed by suction and repeatedly washed with ether. The filtrate and the washings were combined, dried over potassium carbonate and evaporated to dryness in vacuo. The remaining resin was dissolved in a small amount of ethanol and converted into the salt by addition of etheric hydrogen chloride. The material was recrystallized from ethanol/ether. M.P. 190–192° C. Yield: 7.9 g. (81%).

EXAMPLE 37

2-methylaminomethyl-4,5-dimethoxy-α-(4-chlorophenyl)-benzylacohol (Method A)

(a) 12.5 g. of 1 - (4 - chlorophenyl)-5,6-dimethoxyphthalide of M.P. 175° C. were stirred in 100 ml. ethanol and methylamine was introduced with cooling until the solution was saturated. The clear solution was allowed to stand at room temperature for 3 hours, and was then evaporated in vacuum at room temperature. The crystalline residue was digested with petroleum ether and filtered. The 2 - methyl-aminocarbonyl-α-(4-chlorophenyl)-4,5 - dimethoxy-benzylaclohol (M.P. 180° C., (11.5 g.), (83%)), was used as such for the following step:

(b) 3 g. lithium aluminum hydride were dissloved in 100 ml. anhydrous tetrahydrofuran and a slurry of 11.5 g. of the above alcohol in 100 ml. anhydrous tetrahydrofuran was added under stirring and in an atmosphere of nitrogen over a period of 30 minutes. The stirred mixture was then heated to reflux for 10 hours, cooled and decomposed by dropwise addition of water. The inorganic precipitate was filtered by suction, washed with tetrahydrofuran and the solution dried over magnesium sulfate and evaporated to dryness. The residue was dissolved in ethylether and the hydrochloride of the title compound was precipitated by dropwise addition of etheric hydrochloric acid. The salt was recrystallized from ethanol/ether. 7.5 g. (60%). M.P. 190–192° C.

The compounds according to the present invention, that is, those embraced by Formula I above and their nontoxic, pharmacologically acceptable acid addition salts, have useful pharmacodynamic properties. More particularly, the compounds of the instant invention exhibit highly effective anoretic activities in warm-blooded animals and, in contrast to other effective anoretics, cause very minor concurrent motoric excitation.

The anoretic activity of the compounds according to the instant invention was tested on adult laboratory rats by the determining of the median effective anoretic dose ($ED_{50}$ in mgm./kg.) after oral and subcutaneous administration. All of the compounds embraced by Formula I were found to be effective.

The substantial absence of concurrent motoric excitation was ascertained in adult laboratory rats by determining the median effective stimulating dose ($ED_{5000}$ in mgm./kg.) after oral and subcutaneous administration in vibrating cages.

For pharmaceutical purposes the compounds according to the present invention are administered to warm-blooded animals, preferably perorally, as sole active ingredients or in combination with other active ingredients, such as laxatives, in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective dosage unit of the compounds according to the present invention is from 0.166 to 1.67 mgm./kg. body weight, preferably 0.33 to 0.84 mgm./kg. body weight.

The following examples illustrate a few dosage unit compositions comprising a compound of the instant invention as an active ingredient and represent the best mode contemplated of putting the invention to practical use. The parts are parts by weight unless otherwise specified.

EXAMPLE 38

Tablets

The tablet composition was compounded from the following ingredients:

| | Parts |
|---|---|
| 2-methylaminomethyl - α - (4'-chlorophenyl)-benzylalcohol hydrochloride | 20.0 |
| Corn starch | 27.0 |
| Lactose | 247.0 |
| Polyvinylpyrrolidone | 3.0 |
| Magnesium stearate | 1.0 |
| Colloidal silicic acid | 2.0 |
| Total | 300.0 |

Compounding procedure

The individual components were intimately admixed with each other, the mixture was granulated in customary fashion, and the granulate was compressed into 300 mgm./tablets. Each tablet contained 20 mgm. of the benzylalcohol compound and, when administered perorally to a warm-blooded animal of about 60 kg. body weight, produced very good anoretic effects.

EXAMPLE 39

Gelatin capsules

The capsule filler composition was compounded from the following ingredients:

| | Parts |
|---|---|
| 2-methylaminomethyl - α - (4'-chlorophenyl)-benzylalcohol hydrochloride | 25.0 |
| Corn starch | 175.0 |
| Total | 200.0 |

Compounding procedure

The ingredients were intimately admixed with each other, and 200 mgm.-portions of the mixture were filled into gelatin capsules of suitable size. Each capsule contained 25 mgm. of the benzylalcohol compound and, when administered perorally to a warm-blooded animal of about 60 kg. body weight, produced very good anoretic effects.

EXAMPLE 40

Coated sustained-release pills

The pill core composition was compounded from the following ingredients:

| | Parts |
|---|---|
| 2-methylaminomethyl - α - (4'-chlorophenyl)-benzylalcohol hydrochloride | 20.0 |
| Carboxymethylcellulose | 300.0 |
| Stearic acid | 20.0 |
| Cellulose acetate phthalate | 40.0 |
| Total | 380.0 |

Compounding procedure

The benzylalcohol compound, the carboxymethylcellulose and the stearic acid were intimately admixed with each other, and the mixture was granulated in customary fashion, using a solution of the cellulose acetate phthalate in 200 ml. of a mixture of ethanol and ethylacetate. The granulate was compressed into 380 mgm.-pill cores, which were then coated with an aqueous solution of polyvinylpyrrolidone containing 5% sugar. Each coated pill contained 20 mgm. of the benzylalcohol compound and, when administered perorally to a warm-blooded animal of about 60 kg. body weight, produced very good anoretic effects.

Analogous results were obtained when an equal amount of any one of the other compounds embraced by Formula I above or a non-toxic acid addition salt thereof was substituted for the particular benzylalcohol compound in Examples 38 to 40. Likewise, the amount of active ingredient in these examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention.

We claim:

1. 2-methylaminomethyl-α-(4' - chlorophenyl)-benzylalcohol or a non-toxic, pharmacologically acceptable acid addition salt thereof.

2. 2-methylaminomethyl-α-(4' - fluorophenyl)-benzylalcohol or a non-toxic, pharmacologically acceptable acid addition salt thereof.

References Cited

FOREIGN PATENTS

| 984,363 | 2/1965 | Great Britain | 260—570 |
| 6606390 | 11/1966 | Netherlands | 260—570 |

OTHER REFERENCES

Burger, "Medicinal Chemistry," 2nd ed., pp. 42–43 (1960).

ROBERT V. HINES, Primary Examiner

U.S. Cl. X.R.

260—326(R), (S), (A), (L), 326.1, 343.7, 463, 470 471(R), 481(R), 482(R), 501.17, 501.18, 501,19, 501.20, 558(R), (H), (S), 559 (A), 559(R), (D), (H), (T), 562(H), 562(N), (R), 569, 570(R), 570.5(PA), 570.9; 424—253, 280, 300, 301, 324, 330

157.145

PO-1050
(5/69)

UNITED STATES PATENT OFFICE
CERTIFICATE OF CORRECTION

Patent No. 3,635,974                      Dated January 18, 1972

Inventor(s) KURT FRETER, MANFRED GÖTZ, JAMES T. OLIVER and KARL ZEILE

It is certified that error appears in the above-identified patent and that said Letters Patent are hereby corrected as shown below:

Col. 1, line 4 - correct the spelling of "Kurt".
 "   1, line 10- insert --Claims priority, application Germany, December 22, 1967, P 16 43 265.8--.

Col. 5, line 37- "the" should read --in--.

Col.11, line 71- correct the spelling of "hydroxide".
Col.13, line 43- in the formula "-CH$_2$-NH-CH$_2$" should read
                 -- -CH$_2$-NH-CH$_3$ --.

Col.15, line 1 - "of"(second occurrence) should read --by--.

Col.17, line 33- in formula  should read 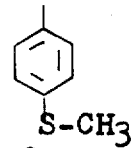

Col. 17, line 60- delete "and was recrystallized from ethanol/petroleum ether";
 "   17, line 74- delete "58 gm (83% of theory) of 2-isobutyl-aminocarbonyl-α-" and substitute --(53 gm) was dissolved in 250 ml of tetrahydrofuran and--.

Col. 18, line 38- correct the spelling of "ethereal".
Col. 19, line 9 - "98.2" should read --98:2--.

Col. 21, line 46- "173 g." should read --17.3 g.---.

Signed and sealed this 22nd day of August 1972.

(SEAL)
Attest:

EDWARD M.FLETCHER,JR.
Attesting Officer

ROBERT GOTTSCHALK
Commissioner of Patents